United States Patent
Hiwatari (10) Patent No.: US 10,827,081 B2
(45) Date of Patent: Nov. 3, 2020

(54) INFORMATION PROCESSING SYSTEM, SERVER APPARATUS, AND NON-TRANSITORY COMPUTER READABLE RECORDING MEDIUM THAT RECORDS AN INFORMATION PROCESSING PROGRAM

(71) Applicant: KYOCERA DOCUMENT SOLUTIONS INC., Osaka (JP)

(72) Inventor: Maya Hiwatari, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/559,668

(22) Filed: Sep. 4, 2019

(65) Prior Publication Data
US 2020/0084319 A1    Mar. 12, 2020

(30) Foreign Application Priority Data
Sep. 7, 2018  (JP) .................................. 2018-167475

(51) Int. Cl.
*H04N 1/00*       (2006.01)

(52) U.S. Cl.
CPC ....... *H04N 1/0009* (2013.01); *H04N 1/00034* (2013.01); *H04N 1/00087* (2013.01); *H04N 1/00244* (2013.01)

(58) Field of Classification Search
None
See application file for complete search history.

(56) References Cited

U.S. PATENT DOCUMENTS

| | | | | |
|---|---|---|---|---|
| 10,009,360 | B1* | 6/2018 | Todd | H04L 63/1416 |
| 2013/0179648 | A1* | 7/2013 | Yagame | G06F 3/0604 |
| | | | | 711/156 |
| 2018/0014085 | A1* | 1/2018 | Nagasaka | H04N 21/4532 |

FOREIGN PATENT DOCUMENTS

| | | |
|---|---|---|
| JP | 2006067156 A | 3/2006 |
| JP | 2017224263 A | 12/2017 |

* cited by examiner

*Primary Examiner* — Frantz Bataille
(74) *Attorney, Agent, or Firm* — Li & Cai Intellectual Property (USA) Office (57) ABSTRACT

Server receives a log from a client apparatus, the client apparatus generating the log after the client apparatus executes a function, the log including a function identifier identifying the function, execution start date-and-time and execution end date-and-time of the function, and a setting value of each of one or more setting items about the function, determines whether or not performance of the function identified by the function identifier included in the received log is lower than a certain criterion on a basis of the execution start date-and-time and the execution end date-and-time included in the received log, and if the server apparatus determines that the performance of the function is low, sends a setting value stored in the storage device to the client apparatus, the setting value being a setting value, with which the performance was high, of each of the one or more setting items about the function-low-in-performance.

6 Claims, 7 Drawing Sheets

| Function identifier 311 | Log 311a |
|---|---|
| | Log 311b |
| Function identifier 312 | Log 312a |
| | Log 312b |

INFORMATION PROCESSING SYSTEM, SERVER APPARATUS, AND NON-TRANSITORY COMPUTER READABLE RECORDING MEDIUM THAT RECORDS AN INFORMATION PROCESSING PROGRAM

CROSS-REFERENCE TO RELATED PATENT APPLICATION

This application claims the benefit of Japanese Priority Patent Application JP 2018-167475 filed Sep. 7, 2018, the entire contents of which are incorporated herein by reference.

FIELD OF THE DISCLOSURE

The present disclosure relates to a technology to cope with a function-low-in-performance that an electric apparatus executes.

BACKGROUND OF THE DISCLOSURE

There is known an art of managing logs of an electric apparatus.

SUMMARY OF THE DISCLOSURE

In an art of managing logs of an electric apparatus, if performance of a function that the electric apparatus executes is low, it is desirable to recover from the function-low-in-performance.

According to an embodiment of the present disclosure, there is provided an information processing system, including:
a client apparatus; and
a server apparatus including a storage device, the server apparatus being configured to communicate with the client apparatus via a network,
the client apparatus being configured to
generate a log after the client apparatus executes a function, the log including a function identifier identifying the function, execution start date-and-time and execution end date-and-time of the function, and a setting value of each of one or more setting items about the function, and
send the generated log to the server apparatus,
the server apparatus being configured to
receive the log from the client apparatus,
determine whether or not performance of the function identified by the function identifier included in the received log is lower than a certain criterion on a basis of the execution start date-and-time and the execution end date-and-time included in the received log, and
if the server apparatus determines that the performance of the function is low, send a setting value stored in the storage device to the client apparatus, the setting value being a setting value, with which the performance was high, of each of the one or more setting items about the function-low-in-performance,
the client apparatus being further configured to
receive, from the server apparatus, the setting value, with which the performance was high, of each of the one or more setting items about the function-low-in-performance, and
set, for each of the one or more setting items about the function-low-in-performance, the received setting value, with which the performance was high.

According to an embodiment of the present disclosure, there is provided a server apparatus, including:
a controller circuit configured to
receive a log from a client apparatus, the client apparatus being configured to generate the log after the client apparatus executes a function, the log including a function identifier identifying the function, execution start date-and-time and execution end date-and-time of the function, and a setting value of each of one or more setting items about the function,
determine whether or not performance of the function identified by the function identifier included in the received log is lower than a certain criterion on a basis of the execution start date-and-time and the execution end date-and-time included in the received log, and
if the server apparatus determines that the performance of the function is low, send a setting value stored in the storage device to the client apparatus, the setting value being a setting value, with which the performance was high, of each of the one or more setting items about the function-low-in-performance.

According to an embodiment of the present disclosure, there is provided a non-transitory computer readable recording medium that records an information processing program, the information processing program causing a controller circuit of a server apparatus to
receive a log from a client apparatus, the client apparatus being configured to generate the log after the client apparatus executes a function, the log including a function identifier identifying the function, execution start date-and-time and execution end date-and-time of the function, and a setting value of each of one or more setting items about the function,
determine whether or not performance of the function identified by the function identifier included in the received log is lower than a certain criterion on a basis of the execution start date-and-time and the execution end date-and-time included in the received log, and
if the server apparatus determines that the performance of the function is low, send a setting value stored in the storage device to the client apparatus, the setting value being a setting value, with which the performance was high, of each of the one or more setting items about the function-low-in-performance.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Hereinafter, an embodiment of the present disclosure will be described with reference to the drawings.

INFORMATION PROCESSING SYSTEM

Figure 1:
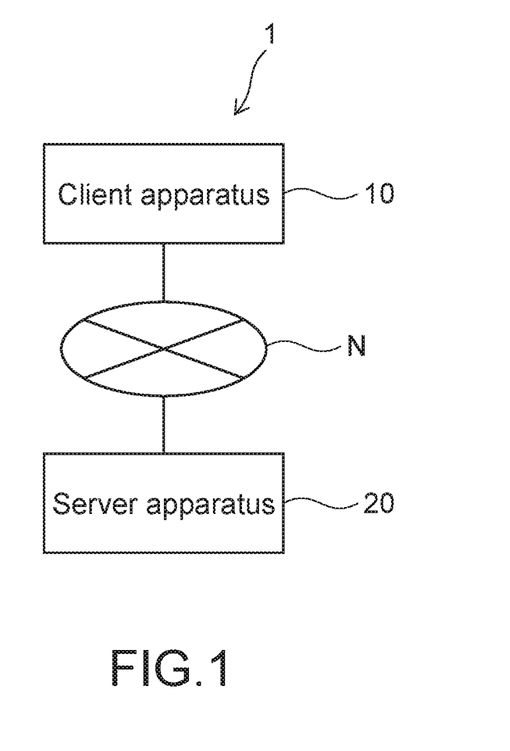
FIG. 1 shows an information processing system according to an embodiment of the present disclosure.

FIG. 1 shows an information processing system according to an embodiment of the present disclosure.

The information processing system 1 includes the client apparatus 10 and the server apparatus 20.

The client apparatus 10 is, for example, an electric apparatus such as an image forming apparatus (MFP, Multifunction Peripheral). The client apparatus 10 is connected to the network N.

The server apparatus 20 is an information processing apparatus such as a typical personal computer. The server apparatus 20 is connected to the network N.

HARDWARE CONFIGURATION OF CLIENT APPARATUS

Figure 2:
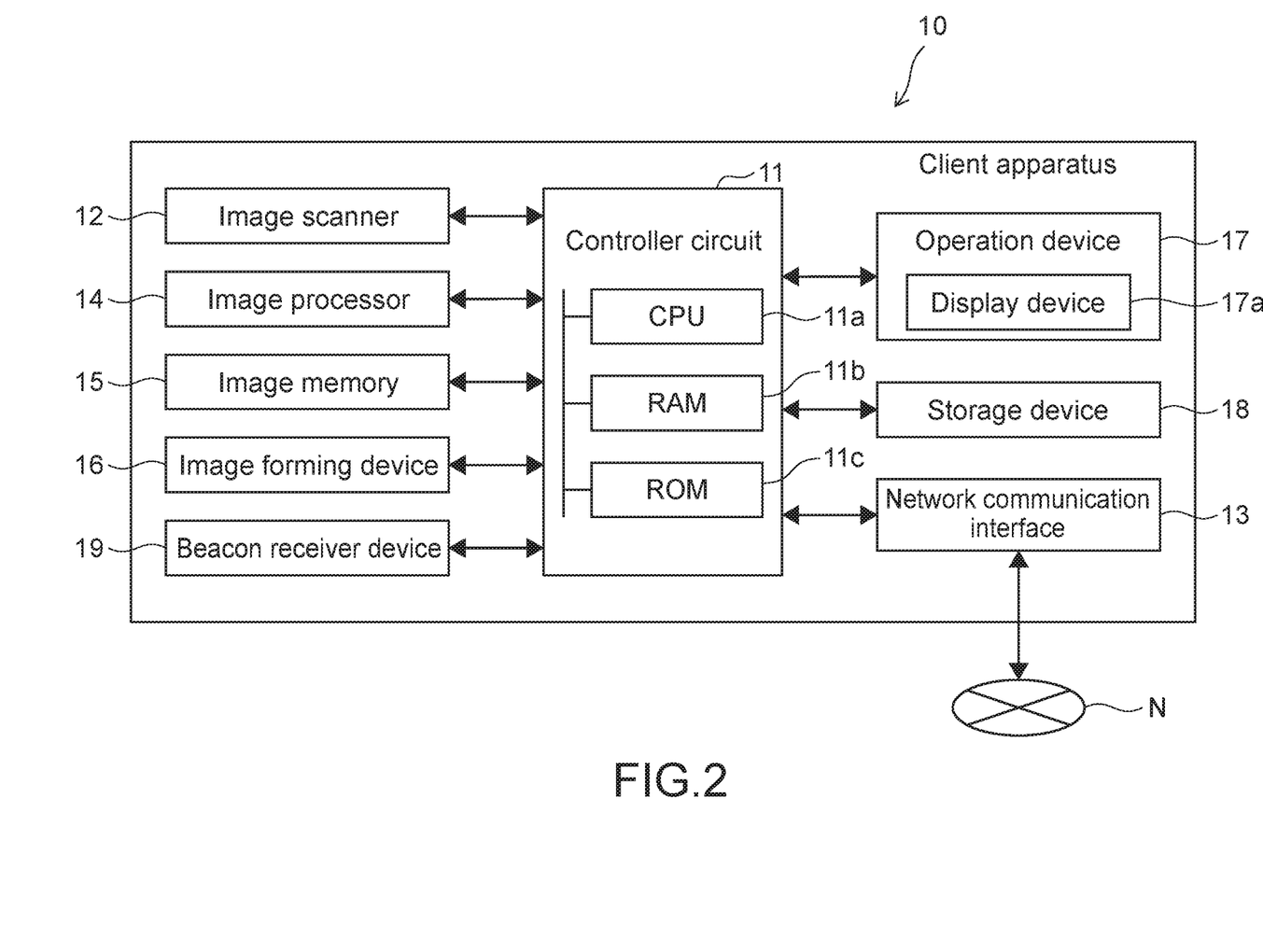
FIG. 2 shows a hardware configuration of a client apparatus.

FIG. 2 shows a hardware configuration of a client apparatus.

The client apparatus 10 includes the controller circuit 11. The controller circuit 11 (controller) includes the CPU (Central Processing Unit) 11a (processor), the RAM (Random Access Memory) 11b, the ROM (Read Only Memory) 11c (memory), dedicated hardware circuits, and the like and performs overall operational control of the client apparatus 10. A computer program that causes the client apparatus 10 to operate as the respective functional units (to be described later) is stored in a non-transitory computer readable recording medium such as a ROM.

The controller circuit 11 is connected to the image scanner 12, the image processor 14, the image memory 15, the image forming device 16, the operation device 17 including the display device 17a, the storage device 18, the network communication interface 13, the beacon receiver device 19, and the like. The controller circuit 11 performs operational control of the respective devices connected thereto and sends/receives signals and data to/from those devices.

HARDWARE CONFIGURATION OF SERVER APPARATUS

Figure 3:
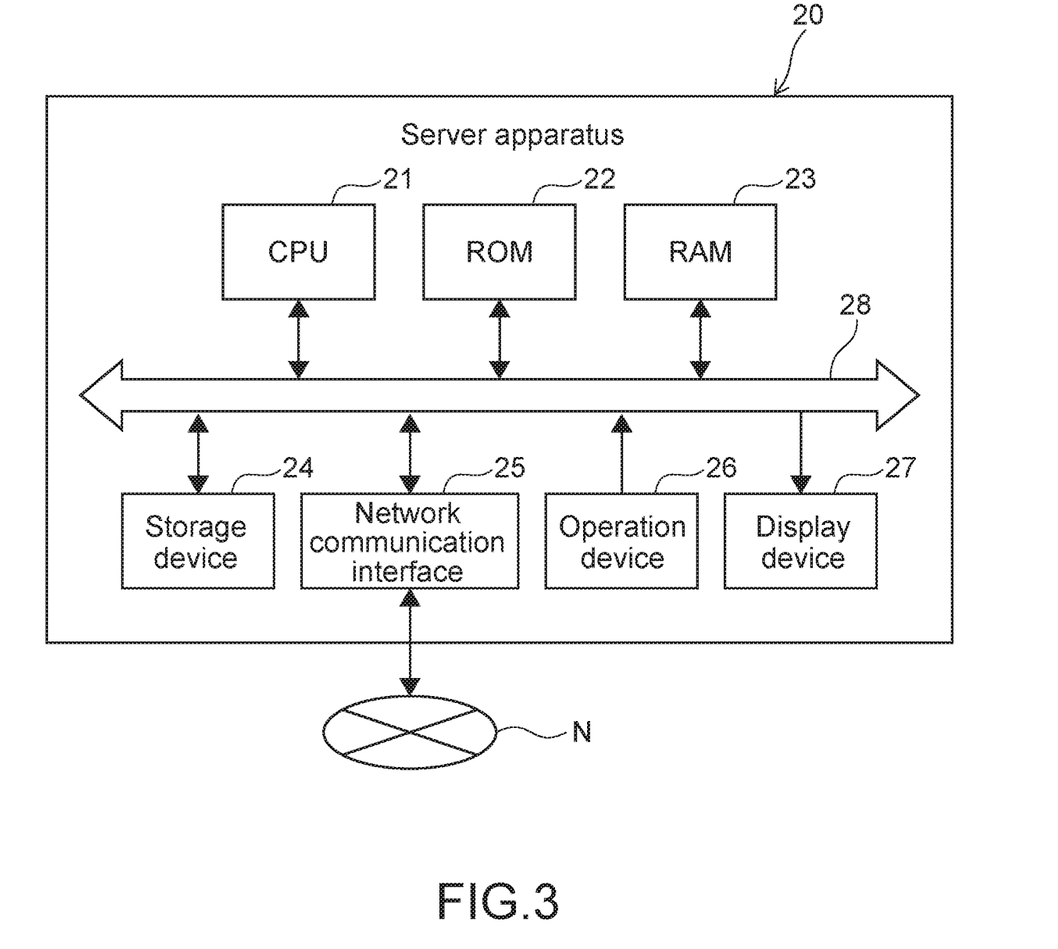
FIG. 3 shows a hardware configuration of a server apparatus.

FIG. 3 shows a hardware configuration of a server apparatus.

The server apparatus 20 includes the CPU 21, the ROM 22, the RAM 23, the storage device 24, the network communication interface 25, the operation device 26, and the display device 27, and the bus 28 connecting them to each other.

The CPU 21 loads information processing programs stored in the ROM 22 in the RAM 23 and executes the information processing programs. The ROM 22 stores programs executed by the CPU 21, data, and the like nonvolatile. The ROM 22 is an example of a non-transitory computer readable recording medium.

FUNCTIONAL CONFIGURATION OF INFORMATION PROCESSING SYSTEM

Figure 4:
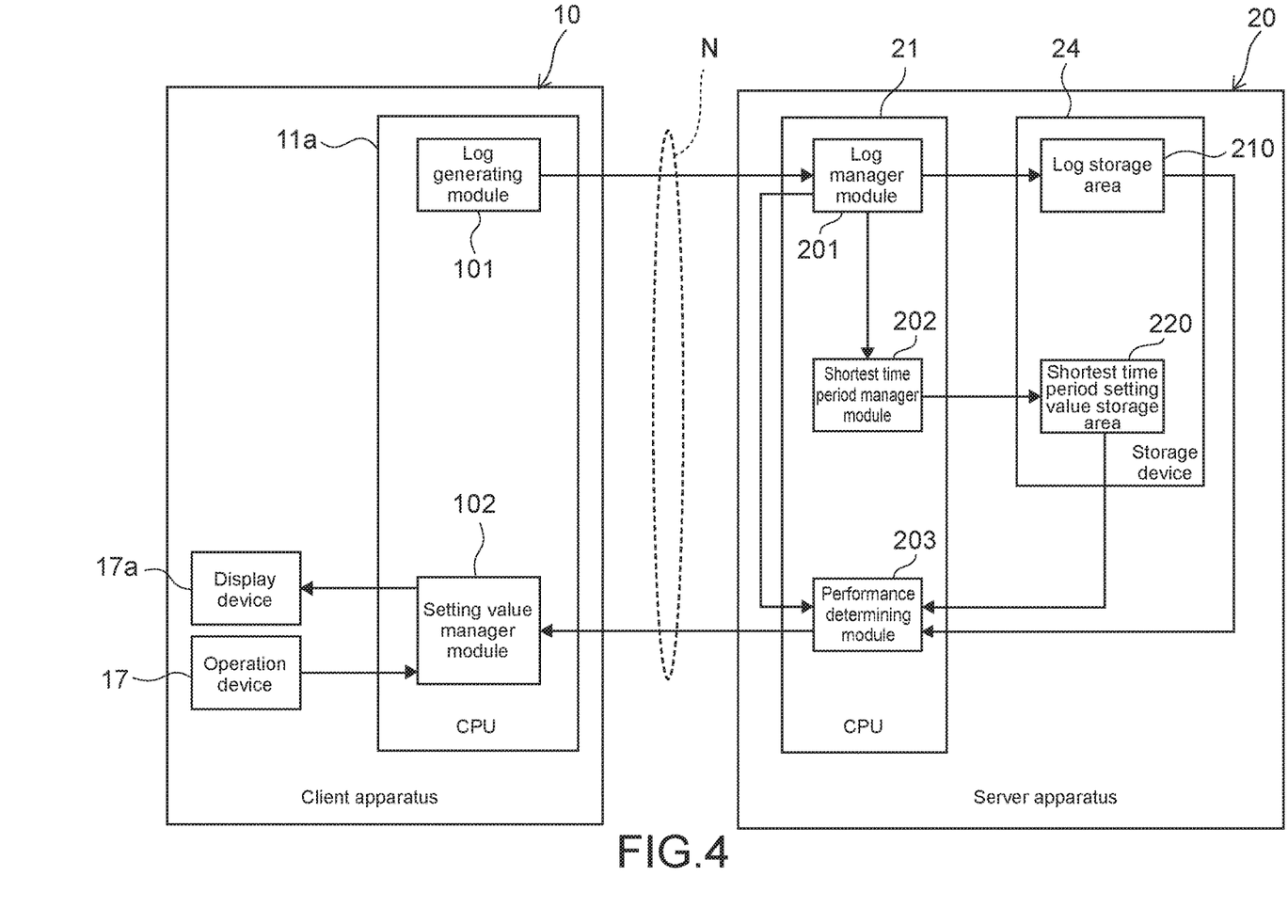
FIG. 4 shows a functional configuration of the information processing system.

FIG. 4 shows a functional configuration of the information processing system.

In the client apparatus 10, the CPU 11a loads an information processing program, which is recorded in the ROM 11c, in the RAM 11b and executes the information processing program to thereby operate as the log generating module 101 and the setting value manager module 102.

In the server apparatus 20, the CPU 21 loads an information processing program, which is recorded in the ROM 22, in the RAM 23 and executes the information processing program to thereby operate as the log manager module 201, the shortest time period manager module 202, and the performance determining module 203.

In the client apparatus 10, the log generating module 101 generates a log of a function that the client apparatus 10 executes. The log generating module 101 sends the generated log to the server apparatus 20 via the network N.

In the server apparatus 20, the log manager module 201 receives the log from the client apparatus 10 via the network N. The log manager module 201 stores the received log in the log storage area 210 of the storage device 24 for each function identifier included in each log.

In the server apparatus 20, the performance determining module 203 determines whether or not performance of the function identified by the function identifier included in the received log is lower than a certain criterion (hereinafter, simply referred to as "low in performance") on a basis of the execution start date-and-time and the execution end date-and-time included in the received log. If the performance determining module 203 determines that the performance of the function is low, the performance determining module 203 sends a setting value stored in the shortest time period setting value storage area 220 to the client apparatus 10 via the network N, the setting value being a setting value, with which the performance was high, of each of the one or more setting items about the function-low-in-performance.

In the client apparatus 10, the setting value manager module 102 receives, from the server apparatus 20 via the network N, the setting value, with which the performance was high, of each of the one or more setting items about the function-low-in-performance. The setting value manager module 102 presents to a user, each of the one or more setting items about the function-low-in-performance and the received setting value, with which the performance was high, for each of the one or more setting items. Further, the setting value manager module 102 presents options for all the present setting values set for the respective setting items to the user to select one of: to change all the present setting values into setting values with which the performance was high; to change some of the present setting values into setting values with which the performance was high; or to remain the present setting values unchanged. Where the setting value manager module 102 detects a user's instruction to change all or some of the setting values, the setting value manager module 102 changes all or some of the setting values in accordance with the instruction.

In the server apparatus 20, the shortest time period manager module 202 compares the execution time period with the shortest time period (certain criterion), the execution time period being from the execution start date-and-time to the execution end date-and-time included in the log received from the client apparatus 10, the shortest time period (certain criterion) being stored in the shortest time period setting value storage area 220 of the storage device 24 as the certain criterion and being of the function identified by the function identifier included in the received log. Where the shortest time period manager module 202 determines that the execution time period is shorter than the shortest time period (certain criterion), updates the shortest time period (certain criterion) stored in the shortest time period setting value storage area 220 with the execution time period from the execution start date-and-time to the execution end date-and-time included in the received log.

OPERATIONAL FLOW OF INFORMATION PROCESSING SYSTEM

Figure 5:
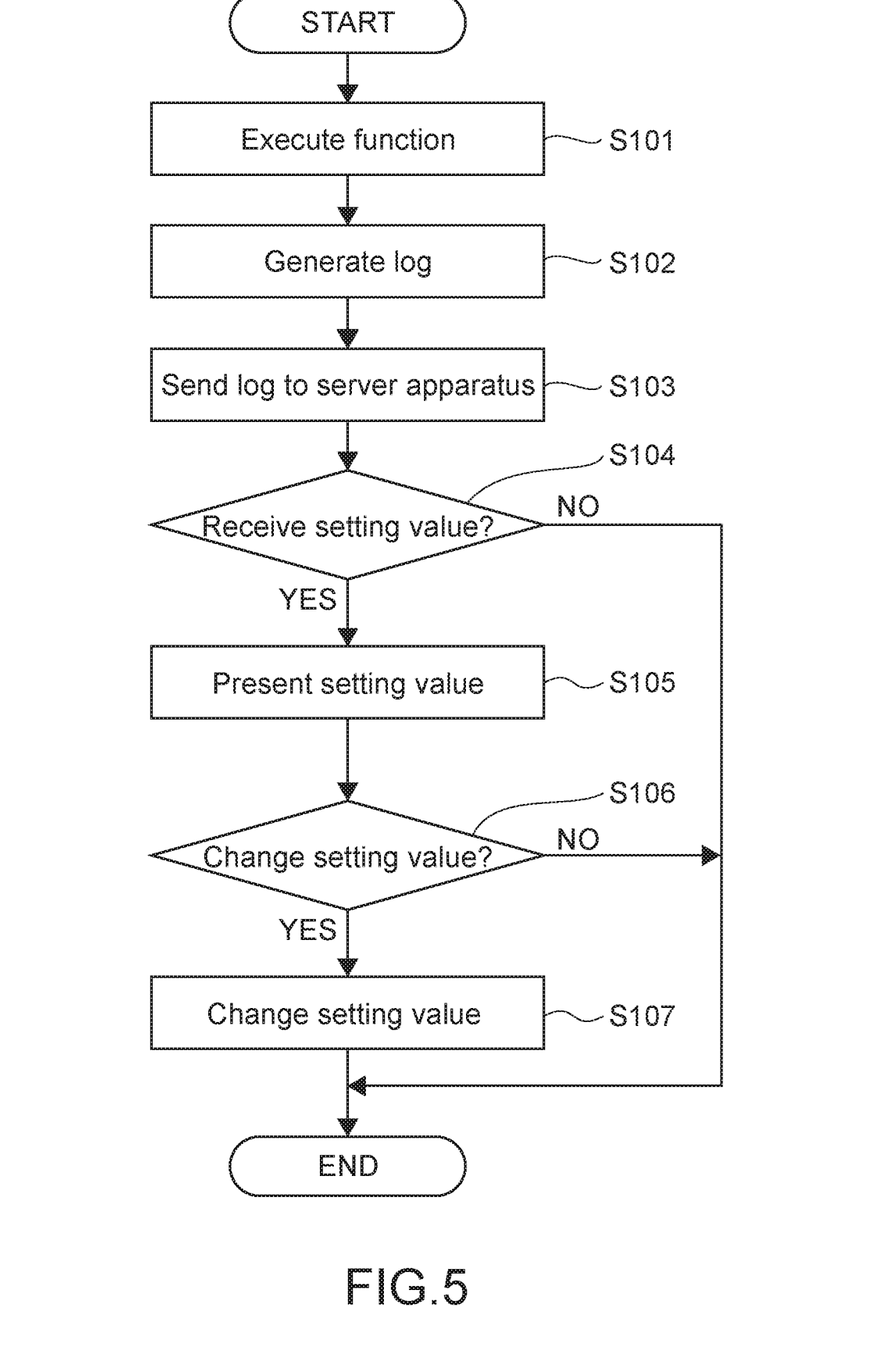
FIG. 5 shows an operational flow of the client apparatus.

FIG. 5 shows an operational flow of the client apparatus.

After the client apparatus 10 executes a function (Step S101), the log generating module 101 generates a log of the executed function (Step S102). Examples of the "function" of an image forming apparatus being the client apparatus include copying, sending E-mail, storing in a local memory, storing in a removal memory, and the like. The "log" at least includes a function identifier identifying the function, execution start date-and-time and execution end date-and-time of the function, and a setting value of each of one or more setting items about the function. In this example, the "function identifier" is information identifying a function such as copying, sending E-mail, storing in a local memory, or storing in a removal memory. Examples of the "one or more setting items about the function" include "emulation", "proxy emulation", "paper feeder instruction operation", "page break standby time", "job name", "user name", "confirmation before banner printing", "wide A4", "automatic cassette change", "end of print job", "remote printing", and the like about the function "copy". A setting value is set for each of those setting items. The log generating module 101 sends the generated log, to the server apparatus 20 via the network N (Step S103).

Figure 6:
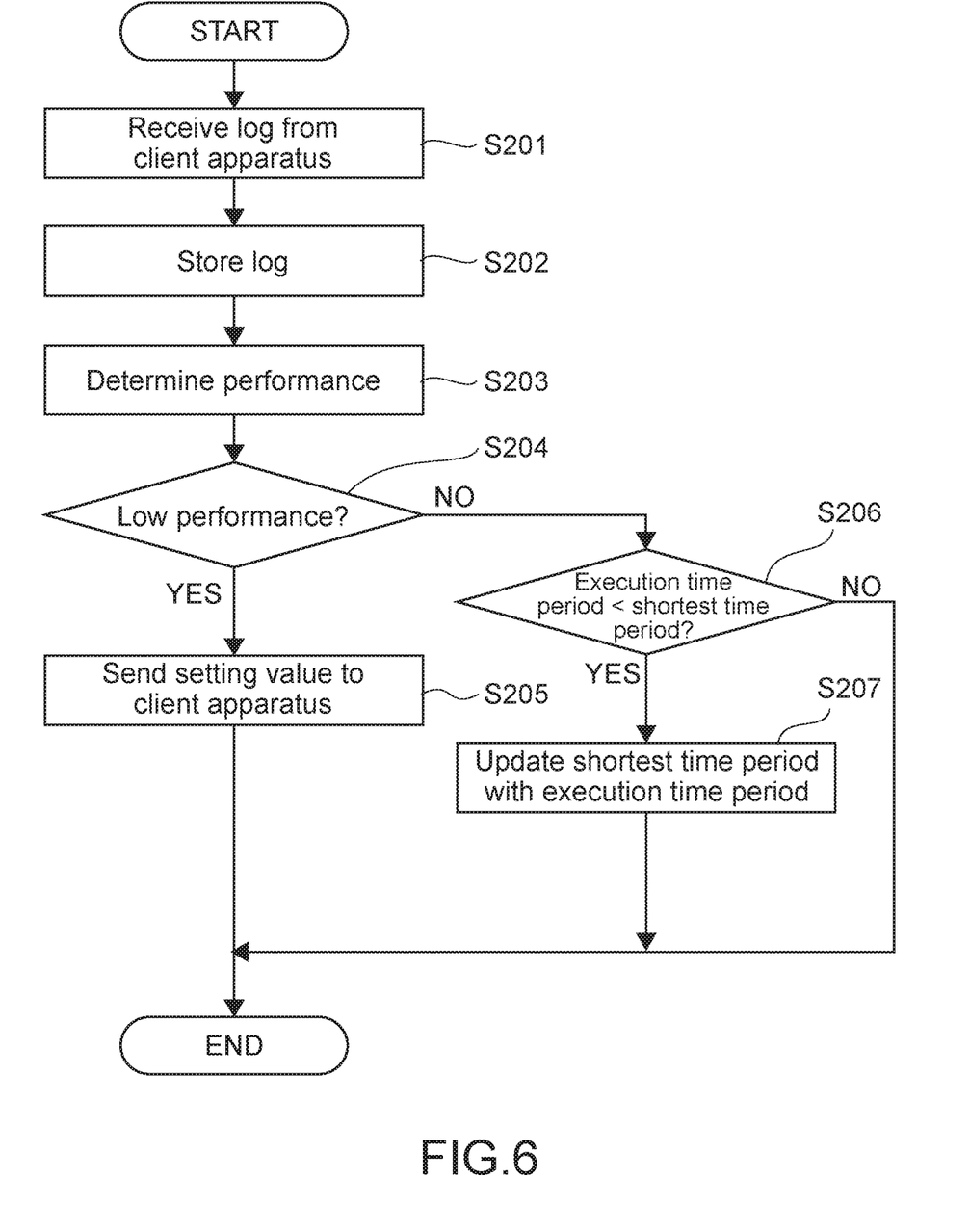
FIG. 6 shows an operational flow of the server apparatus.

FIG. 6 shows an operational flow of the server apparatus.

In the server apparatus 20, the log manager module 201 receives the log from the client apparatus 10 via the network N (Step S201). The log manager module 201 stores the received log in the log storage area 210 of the storage device 24 for each function identifier included in a log (Step S202).

Figure 7:
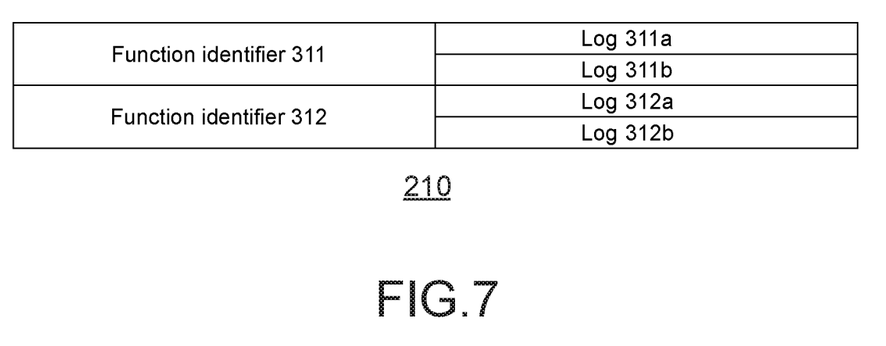
FIG. 7 shows an example of data stored in the log storage area.

FIG. 7 shows an example of data stored in the log storage area.

The log storage area 210 stores, for each function identifier, one or more (typically, plurality of) logs that the server apparatus 20 received previously. In this example, the log storage area 210 stores the logs 311a and 311b for one function identifier 311. The log storage area 210 stores the logs 312a and 312b for another function identifier 312. Each of the logs 311a, 311b, 312a, and 312b at least includes execution start date-and-time and execution end date-and-time.

In the server apparatus 20, the performance determining module 203 determines whether or not performance of the function identified by the function identifier included in the received log is low on a basis of the execution start date-and-time and the execution end date-and-time included in the received log (Step S203). Specifically, if a difference between an execution time period and the shortest time period (certain criterion) exceeds a threshold value, the performance determining module 203 determines that the performance of the function identified by the function identifier included in the received log is low, the execution time period being a time period from the execution start date-and-time to the execution end date-and-time included in the received log, the shortest time period (certain criterion) being stored in the shortest time period setting value storage area 220 and being of the function identified by the function identifier included in the received log (Step S204, YES).

The shortest time period setting value storage area 220 stores a shortest time period (certain criterion) from the execution start date-and-time to the execution end date-and-time for each function identifier, out of execution start date-and-time and execution end date-and-time included in one or more (typically, plurality of) logs that the server apparatus 20 has received previously. The shortest time period setting value storage area 220 further stores the setting value of that time (setting value, with which the performance was high). In other words, the shortest time period setting value storage area 220 stores, for each function, one shortest time period (certain criterion) and the setting value of that time (setting value, with which the performance was high).

In the server apparatus 20, if the performance determining module 203 determines that the performance of the function is low (Step S204, YES), the performance determining module 203 sends a setting value stored in the shortest time period setting value storage area 220 to the client apparatus 10 via the network N, the setting value being a setting value, with which the performance was high, of each of the one or more setting items about the function-low-in-performance (Step S205).

In the client apparatus 10, the setting value manager module 102 receives, from the server apparatus 20 via the network N, the setting value, with which the performance was high, of each of the one or more setting items about the function-low-in-performance (Step S104). The setting value manager module 102 presents to a user (for example, displays on the display device 17a being a touch panel. The same applies to the following description), each of the one or more setting items about the function-low-in-performance and the received setting value, with which the performance was high. Further, the setting value manager module 102 presents options for all the present setting values set for the respective setting items to the user to select one of: to change all the present setting values into setting values with which the performance was high; to change some of the present setting values into setting values with which the performance was high; or to remain the present setting values unchanged (Step S105).

In the client apparatus 10, the setting value manager module 102 detects a user's operation input in the operation device 17 being a touch panel, and detects a user's instruction (to change all or some of the setting values, or to remain the setting values unchanged) (Step S106). Where the setting value manager module 102 detects an instruction to change all or some of the setting values (Step S106, YES), the setting value manager module 102 changes all or some of the setting values in accordance with the instruction (Step S107). Meanwhile, where the setting value manager module 102 detects an instruction to remain the setting values unchanged (Step S106, NO), the setting value manager module 102 remains the setting values unchanged and finishes the processing.

By the way, in the server apparatus 20, the performance determining module 203 does not determine that the performance of the function identified by the function identifier included in the received log is low (Step S204, NO). This case will be described. Note that the client apparatus 10 proceeds to "Step S104, NO" in this case.

In the server apparatus 20, the shortest time period manager module 202 compares an execution time period with the shortest time period (certain criterion), the execution time period being a time period from the execution start date-and-time to the execution end date-and-time included in the log received from the client apparatus 10, the shortest time period (certain criterion) being stored in the shortest time period setting value storage area 220 of the storage device 24 and being of the function identified by the function identifier included in the received log (Step S206).

In the server apparatus 20, the shortest time period manager module 202 determines that the execution time period is shorter than the shortest time period (certain criterion), the execution time period being a time period from the execution start date-and-time to the execution end date-and-time included in the log received from the client apparatus 10, the shortest time period (certain criterion) being stored in the shortest time period setting value storage area 220 of the storage device 24 and being of the function identified by the function identifier included in the received log (Step S206, YES). In this case, the shortest time period manager module 202 updates the shortest time period (certain criterion) stored in the shortest time period setting value storage area 220 with the execution time period from the execution start date-and-time to the execution end date-and-time included in the received log (Step S207).

Meanwhile, if the shortest time period manager module 202 does not determine that the execution time period is shorter than the shortest time period (certain criterion), the execution time period being a time period from the execution start date-and-time to the execution end date-and-time included in the log received from the client apparatus 10, the shortest time period (certain criterion) being stored in the shortest time period setting value storage area 220 of the storage device 24 and being of the function identified by the function identifier included in the received log (Step S206, NO), the server apparatus 20 finishes the processing.

CONCLUSION

According to the present embodiment, if the server apparatus 20 determines that performance of a function is low, the server apparatus 20 sends a setting value to the client apparatus 10, the setting value being a setting value, with which the performance was high, of each of the one or more setting items about the function-low-in-performance. The client apparatus 10 sets, for each of the one or more setting items about the function-low-in-performance, the received setting value, with which the performance was high. As a result, immediately after the client apparatus executes a the function-low-in-performance, the server apparatus 20 is capable of determining that the performance is low and sending the setting value to the client apparatus 10, and the client apparatus 10 is capable of changing the setting value. As a result, the client apparatus 10 is capable of recovering from the low performance in a short time.

According to the present embodiment, the server apparatus 20 determines that the function is low in performance where the difference between the execution time period and the shortest time period (certain criterion) exceeds a threshold value. So, if a threshold value is set in view of a time period with which a user feels uncomfortable, for example, the client apparatus 10 may present the function-low-in-performance to a user in view of an execution time period with which a user is likely to feel uncomfortable.

According to the present embodiment, if the execution time period based on the received log is shorter than the shortest time period (certain criterion), the server apparatus 20 updates the shortest time period (certain criterion) stored in the storage device 24 with the execution time period. As a result, the shortest time period (certain criterion) stored in the storage device 24 is always the latest value.

According to the present embodiment, in response to a user's needs, the client apparatus 10 is capable of setting, for at least one setting item, the setting value of the at least one received setting item, with which the performance was high.

It should be understood by those skilled in the art that various modifications, combinations, sub-combinations and alterations may occur depending on design requirements and other factors insofar as they are within the scope of the appended claims or the equivalents thereof

What is claimed is:

1. An information processing system, comprising:
 a client apparatus; and
 a server apparatus including a storage device, the server apparatus being configured to communicate with the client apparatus via a network,
 the client apparatus being configured to
  generate a log after the client apparatus executes a function, the log including a function identifier identifying the function, execution start date-and-time and execution end date-and-time of the function, and a setting value of each of one or more setting items about the function, and
  send the generated log to the server apparatus,
 the server apparatus being configured to
  receive the log from the client apparatus,
  store in the storage device, as a certain criterion, a shortest time period from the execution start date-and-time to the execution end date-and-time for each function identifier, out of execution start date-and-time and execution end date-and-time included in one or more logs that the server apparatus has received previously,
  determine whether or not performance of the function identified by the function identifier included in the received log is lower than the certain criterion on a basis of the execution start date-and-time and the execution end date-and-time included in the received log, and
  if the server apparatus determines that the performance of the function is low, send a setting value stored in the storage device to the client apparatus, the setting value being a setting value, with which the performance was high, of each of the one or more setting items about the function-low-in-performance,
 the client apparatus being further configured to
  receive, from the server apparatus, the setting value, with which the performance was high, of each of the one or more setting items about the function-low-in-performance, and
  set, for each of the one or more setting items about the function-low-in-performance, the received setting value, with which the performance was high.

2. The information processing system according to claim 1, wherein the server apparatus is configured to
 if a difference between an execution time period and the shortest time period exceeds a threshold value, determine that the performance of the function identified by the function identifier is low, the execution time period being a time period from the execution start date-and-time to the execution end date-and-time included in the received log, the shortest time period being stored in the storage device as the certain criterion and being of the function identified by the function identifier included in the received log.

3. The information processing system according to claim 2, wherein
 the server apparatus is configured to,
  if the server apparatus does not determine that the performance of the function is low, compare the execution time period with the shortest time period, the execution time period being from the execution start date-and-time to the execution end date-and-time included in the received log, the shortest time period being stored in the storage device as the certain criterion and being of the function identified by the function identifier included in the received log, and if the execution time period is shorter than the shortest time period, update the shortest time period stored in the storage device as the certain criterion with the execution time period.

4. The information processing system according to claim 1, wherein the client apparatus is configured to set, for at least one setting item of the one or more setting items about the function-low-in-performance, the setting value of the at least one received setting item, with which the performance was high.

5. A server apparatus, comprising:

a controller circuit configured to receive a log from a client apparatus, the client apparatus being configured to generate the log after the client apparatus executes a function, the log including a function identifier identifying the function, execution start date-and-time and execution end date-and-time of the function, and a setting value of each of one or more setting items about the function, store in the storage device, as a certain criterion, a shortest time period from the execution start date-and-time to the execution end date-and-time for each function identifier, out of execution start date-and-time and execution end date-and-time included in one or more logs that the server apparatus has received previously, determine whether or not performance of the function identified by the function identifier included in the received log is lower than the certain criterion on a basis of the execution start date-and-time and the execution end date-and-time included in the received log, and if the server apparatus determines that the performance of the function is low, send a setting value stored in the storage device to the client apparatus, the setting value being a setting value, with which the performance was high, of each of the one or more setting items about the function-low-in-performance.

6. A non-transitory computer readable recording medium that records an information processing program, the information processing program causing a controller circuit of a server apparatus to receive a log from a client apparatus, the client apparatus being configured to generate the log after the client apparatus executes a function, the log including a function identifier identifying the function, execution start date-and-time and execution end date-and-time of the function, and a setting value of each of one or more setting items about the function, store in the storage device, as a certain criterion, a shortest time period from the execution start date-and-time to the execution end date-and-time for each function identifier, out of execution start date-and-time and execution end date-and-time included in one or more logs that the server apparatus has received previously, determine whether or not performance of the function identified by the function identifier included in the received log is lower than the certain criterion on a basis of the execution start date-and-time and the execution end date-and-time included in the received log, and if the server apparatus determines that the performance of the function is low, send a setting value stored in the storage device to the client apparatus, the setting value being a setting value, with which the performance was high, of each of the one or more setting items about the function-low-in-performance.

* * * * *